United States Patent Office 3,419,524
Patented Dec. 31, 1968

3,419,524
POLYPHOSPHITES AS STABILIZERS FOR HYDROCARBON POLYMERS
Millard S. Larrison, Livingston, N.J., assignor to Weston Chemical Corporation, New York, N.Y., a corporation of New Jersey
No Drawing. Original application Jan. 4, 1965, Ser. No. 423,393, now Patent No. 3,375,304, Mar. 26, 1968. Divided and this application Sept. 8, 1967, Ser. No. 666,477
19 Claims. (Cl. 260—45.95)

ABSTRACT OF THE DISCLOSURE

Compounds are prepared having the formula

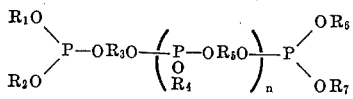

where $R_1$, $R_2$, $R_4$, $R_6$ and $R_7$ are carbocyclic aryl, $R_3$ and $R_5$ are a member of the group consisting of polyalkylene glycol, alkylidene bisphenol, hydrogenated alkylidene bisphenol, and a ring halogenated alkylidene bisphenol from which the two terminal hydrogens have been removed and $n$ is an integer of at least 1. The compounds are useful as stabilizers for hydrocarbon polymers.

---

This application is a division of application Ser. No. 423,393, filed Jan. 4, 1965, now U.S. Patent No. 3,375,304.

It is an object of the present invention to prepare improved stabilizers for natural and synthetic rubber.

A further object is to prepare novel phosphites having at least three phosphorus atoms in the molecule.

An additional object is to prepare phosphites of improved hydrolytic stability.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing phosphites having the formula

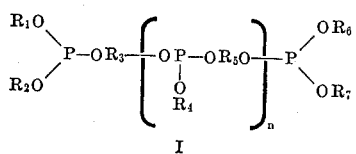

I where $R_1$, $R_2$, $R_4$, $R_6$ and $R_7$ are carbocyclic aryl, e.g., phenyl or alkylphenyl having 1 to 18 carbon atoms in the alkyl group or are haloaryl, e.g., trichlorophenyl, and $R_3$ and $R_5$ are a polyalkylene glycol or an alkylidene bisphenol, or a hydrogenated alkylidene bisphenol, or a ring halogenated alkylidene bisphenol residue from which the two terminal hydrogens have been removed. Preferably $R_1$, $R_2$, $R_4$, $R_6$ and $R_7$ are alkylphenyl having at least four carbon atoms in the alkyl group since better hydrolytic stability is obtained than when $R_1$, $R_2$, $R_4$, $R_6$ and $R_7$ are phenyl or alkylphenyl having up to three carbon atoms in the alkyl group. Most preferably $R_1$, $R_2$, $R_4$, $R_6$ and $R_7$ are alkylphenyl having at least eight carbon atoms in the alkyl group in order to get maximum hydrolytic stability. It will be understood that positional isomers exist for the compounds having five or more phosphorus atoms.

Preferably $R_3$ and $R_5$ are residues of polypropylene glycol since better hydrolytic stability is obtained due to the presence of linkages to the phosphorus atoms which are residues of secondary alcohols. (The normal method for preparing polypropylene glycols results in over 65% of secondary alcohol groups.) Most preferably $R_3$ and $R_5$ are residues of polypropylene glycols having 6–8 repeating units such as polypropylene glycol 425 (polypropylene glycol with a molecular weight of 425). Other polyalkylene glycol residues within $R_3$ and $R_5$ include polyethylene glycol, polytetramethylene glycol, polybutylene glycol and polytrimethylene glycol. Mixtures of polyalkylene glycols or mixtures of these with alkylidene bisphenols or hydrogenated alkylidene bisphenols are also within the scope of $R_3$ and $R_5$. In Formula I $n$ is an integer of at least 1 and can be 20 or more.

Compounds within the present invention include pentakis(nonylphenyl)bis(polypropylene glycol 425)triphosphite,
hexakis(nonyl phenyl)tris(polypropylene glycol) tetraphosphite,
heptakisff(nonyl phenyl)tetrakis(polypropylene glycol 425)pentaphosphite,
octakis(nonyl phenyl)pentakis(polypropylene glycol 425)hexaphosphite,
nonakis(nonyl phenyl)hexakis(polypropylene glycol 425)heptaphosphite,
decakis(nonyl phenyl)heptakis(polypropylene glycol 425)octaphosphite,
eicosakis(nonyl phenyl)heptadecakis(polypropylene glycol 425)octadecaphosphite,
docosakis(nonyl phenyl)nonadecakis(polypropylene glycol 425)eicosaphosphite,
pentakis(octylphenyl)bis(polypropylene glycol 425) triphosphite,
hexakis(octylphenyl)tris(polypropylene glycol 425) tetraphosphite,
heptakis(octylphenyl)tetrakis(polypropylene glycol 425)pentaphosphite,
octakis(octylphenyl)pentakis(polypropylene glycol 425)hexaphosphite,
decakis(octylphenyl)heptakis(polypropylene glycol 425)octaphosphite,
pentakis(butylphenyl)bis(polypropylene glycol 425) triphosphite,
heptakis(butylphenyl)tetrakis(polypropylene glycol 425)pentaphosphite,
decakis(butylphenyl)heptakis(polypropylene glycol 425)octaphosphite,
pentakis(dodecylphenyl)bis(polypropjylene glycol 425) triphosphite,
heptakis(dodecylphenyl)tetrakis(polypropylene glycol 425)pentaphosphite,
pentakis(octadecylphenyl)bis(polypropylene glycol 425)triphosphite,
octakis(octadecylphenyl)pentakis(polypropylene glycol 425)hexaphosphite,
pentakis(phenyl)bis(polypropylene glycol 425) triphosphite,
heptakis(phenyl)tetrakis(polypropylene glycol 425) pentaphosphite,
undecakis(phenyl)octakis(polypropylene glycol 425) nonaphosphite,
pentakis(methylphenyl)bis(polypropylene glycol 425) triphosphite,
octakis(methylphenyl)pentakis(polypropylene glycol 425)hexaphosphite,
hexakis(propylphenyl)tris(polypropylene glycol 425) tetraphosphite,
pentakis(nonylphenyl)bis(dipropylene glycol)triphosphite, hexakis(octylphenyl)tris(dipropylene glycol)tetraphosphite,
heptakis(decylphenyl)tetrakis(dipropylene glycol) pentaphosphite,
decakis(nonylphenyl)heptakis(dipropylene glycol) octaphosphite,
heptakis(octylphenyl)tetrakis(tripropylene glycol) pentaphosphite,
pentakis(nonylphenyl)bis(polypropylene glycol molecular weight 365)triphosphite,
heptakis(nonylphenyl)tetrakis(polypropylene glycol molecular weight 485)pentaphosphite,
octakis(octylphenyl)pentakis(polypropylene glycol molecular weight 2025)phosphite,
pentakis(nonylphenyl)bis(polypropylene glycol molecular weight 2025)triphosphite,
pentakis(amylphenyl)bis(polyethylene glycol molecular weight 2000)triphosphite,
pentakis(2,4,6-trichlorophenyl)bis(polypropylene glycol 425)triphosphite,
heptakis(nonylphenyl)tetrakis(polyethylene glycol molecular weight 310)pentaphosphite,
nonakis(hexylphenyl)hexakis(diethylene glycol) heptaphosphite,
heptakis(pentachlorophenyl)tetrakis(polypropylene glycol 425)pentaphosphite,
heptakis(nonylphenyl)tetrakis(polytetramethylene glycol molecular weight 450)pentaphosphite,
pentakis(heptylphenyl)bis(polytrimethylene glycol molecular weight 425)triphosphite,
heptakis(octylphenyl)tetrakis(poly-1,2-butylene glycol molecular weight 500)pentaphosphite,
pentakis(nonylphenyl)bis(bisphenol A)triphosphite,
heptakis(nonylphenyl)tetrakis(bisphenol A) pentaphosphite,
nonakis(octylphenyl)hexakis(bisphenol A)heptaphosphite,
pentakis(nonylphenyl)bis(4,4'-isopropylidene dicyclohexanol)triphosphite,
heptakis(octylphenyl)tetrakis(4,4'-isopropylidene dicyclohexanol)pentaphosphite,
hexakis(octylphenyl)tris(tetrabromobisphenol A) tetraphosphite,
pentakis(nonylphenyl)bis(tetrachlorobisphenol A) triphosphite,
heptakis(nonylphenyl)tetrakis(tetrachlorobisphenol A)pentaphosphite,
heptakis(nonylphenyl)bis(polypropylene glycol-4,4'-isopropylidene dicyclohexanol)tetraphosphite,
octakis(nonylphenyl)bis(polypropylene glycol 425) tris(dipropylene glycol)hexaphosphite,
hexakis(pentabromophenyl)tris(polypropylene glycol 425)tetraphosphite,
heptakis(nonylphenyl)bis(polypropylene glycol 425) bis(polyethylene glycol 400 molecular weight) pentaphosphite,
heptakis(4-chlorophenyl)tetrakis(polypropylene glycol 425)pentaphosphite.

Unless otherwise indicated in the specification the alkylphenyl has the alkyl group in the para position. Thus in the preceding paragraph the alkyl groups are in the position para to the oxygen substituent on the phenyl. However, the invention is equally applicable to the meta and ortho alkylphenyl compounds and the claims include all three isomers. Thus, for example there are included within the invention ptntakis(o-nonylphenyl)bis(polypropylene glycol 425) triphosphite,
heptakis(m-nonylphenyl)tetrakis(polypropylene glycol 425)pentaphosphite, and
octakis(o-octylphenyl)pentakis(dipropylene glycol) hexaphosphite,
heptakis(p-tert.-octylphenyl)tetrakis(polypropylene glycol 425)pentaphosphite.

Unless otherwise indicated all parts and percentages are by weight.

The products also are excellent stabilizers for hydrocarbon polymers when used in an amount of 0.01 to 20% of the polymer. Thus they can be employed to stabilize polyethylene, polypropylene, ethylenepropylene copolymer (e.g., a 50:50 copolymer), polystyrene, acrylonitrilebutadiene-styrene terpolymer, natural rubber, GR–S (rubbery butadiene-styrene copolymer), cis isoprene polymer, polybutadiene, polyisobutylene, isobutylene-butadiene copolymer (e.g., butyl rubber such as a 97:3 copolymer). They can also be used to improve the fire resistance of cellulose, cellulose esters and ethers, e.g., cellulose acetate, cellulose nitrate, cellulose acetate-butyrate, ethyl cellulose, polystyrene, polyethylene, polypropylene and other polymeric monoolefins and polyolefins.

The compounds can be prepared in several ways. Thus thre can be employed reactants according to Equations 1, 2, 3 or 4 infra.

(1)

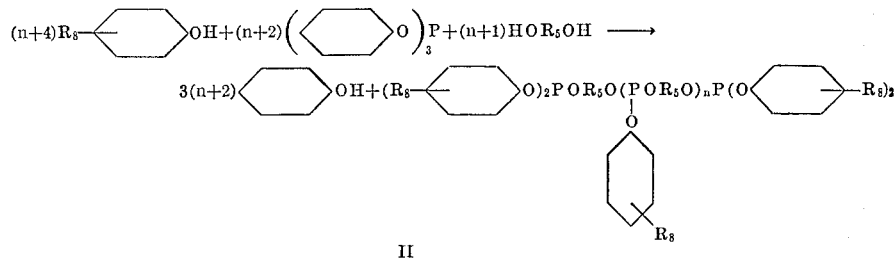

where $R_8$ is alkyl, and $R_5$ and $n$ are as previously defined.

(2)

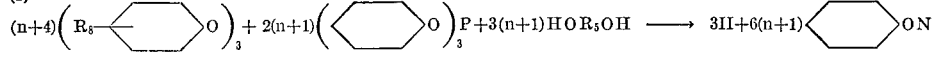

where $n$, $R_5$ and $R_8$ are as previously defined.

(3)

$$R_8-\!\!\!\left\langle\;\right\rangle\!\!\!-O$$
$$R_5-\!\!\!\left\langle\;\right\rangle\!\!\!-O-P + (n+1)HOR_5OH \longrightarrow$$
$$(n+4)\!\!\!\left\langle\;\right\rangle\!\!\!-O$$

$$II + (n+4)\!\!\!\left\langle\;\right\rangle\!\!\!-OH + nR_8-\!\!\!\left\langle\;\right\rangle\!\!\!-OH$$

where $n$, $R_5$ and $R_8$ are as previously defined.

(4) $n+2(R_1O)_3P + (n+1)HOR_5OH \rightarrow I + (2n+2)R_1OH$ where $R_1$, $R_5$ and $n$ are as previously defined.

The reaction under all of Equations 1–4 is preferably catalyzed with 0.1–5% by weight of the starting phosphite reactant of a dialkyl phosphite, a diaryl phosphite, a dihaloaryl phosphite or an alkaline catalyst such as an alkali metal alcoholate or phenolate. As examples of catalysts there can be used diphenyl phosphite, didecyl phosphite, phenyl decyl phosphite, di(o-cresyl)phosphite, di(p-cresyl)phosphite, di(m-cresyl)phosphite, di(nonylphenyl)phosphite, di(p-dodecylphenyl)phosphite, di(o-chlorophenyl)phosphite, di(2,4 - dimethylphenyl)phosphite, di(p-bromophenyl)phosphite, diethyl phosphite, dicyclohexyl phosphite, dioctadecyl phosphite, sodium phenolate, sodium decylate, potassium phenolate, potassium cresylate, sodium ethylate and sodium octadecanolate. Diaryl phosphites are the preferred catalysts.

At the end of the distillation the product in the flask had a deep red color. It was cooled to 150° C. and treated with 20 grams of soda ash and filtered. The product became light yellow in color upon contact with the soda ash. The product was hexakis(nonylphenyl)bis(polypropylene glycol) hydrogenated bisphenol A having a R.I. at 25° C. of 1.5104, acid number of 0.013 and specific gravity at 25° C. of 1.04 and phosphorus content 4.9%, molecular weight 2524. The product was a mixture of

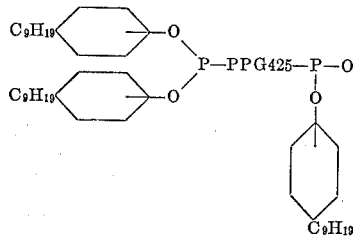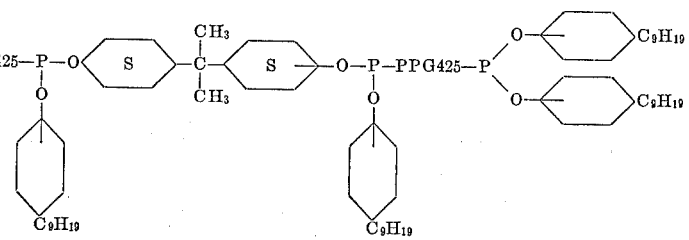

with isomeric compounds containing the polypropylene glycol and hydrogenated bisphenol A linking groups.

EXAMPLE 1

860 grams (1.25 moles) of tris(nonylphenyl)phosphite, 310 grams (1.00 mole) of triphenyl phosphite, 637 grams (1.50 moles) of polypropylene glycol 425 and 10 grams of diphenyl phosphite as a catalyst were heated and the phenol removed by vacuum distillation. Terminal conditions were 195° C. and 2 mm. There was removed 289 grams of distillate (almost all phenol) with a set point of 38° C. At the end of the distillation period the flask contents were medium red in color. The product was treated at 150° C. with 10 grams of soda ash, 10 grams of filter aid (Hi-flow) and 10 grams of attapulgus clay (Attagel). On addition to the soda ash the product immediately changed from red to light yellow. After stirring 10 minutes at 140–150° C. the product was filtered through Whatman No. 3 filter paper. The product was pentakis-(nonylphenyl)bis(polypropylene glycol 425)-triphosphite, a clear, light yellow viscous fluid R.I. at 25° C. 1.5006, acid number 0.03, sp. gr. at 25° C. 1.04, and phosphorus content 4.5–4.6%, molecular weight 2034.

EXAMPLE 2

1182 grams (1 mole) of tetrakis(nonylphenyl) hydrogenated bisphenol A diphosphite (prepared according to application Ser. No. 366,891, filed May 12, 1964), 850 grams (2 moles) of polypropylene glycol 425, 457 grams (2/3 mole) of tris(nonylphenyl)phosphite, 547 grams (4/3 moles) of triphenyl phosphite and 10 grams of diphenyl phosphite (catalyst) were heated and the phenol formed removed at reduced pressure. Terminal conditions were 170° C. and 2 mm. 404 grams of distillate were recovered (mainly phenol) with a set point of 34° C.

EXAMPLE 3

802 grams (1⅙ moles) of tris(nonylphenyl)phosphite, 850 grams (2 moles) of polypropylene glycol 425, 413 grams (1⅓ moles) of triphenyl phosphite and 10 grams of diphenyl phosphite (catalyst) were heated and the phenol removed at 2–5 mm. pressure. Terminal conditions were 195° C. and 2 mm. There were removed 379 grams of phenol distillate, set point 38° C.

The residue was treated with sodium carbonate, Attagel and Hi-flo and filtered. The product was a pale yellow fluid of medium viscosity, R.I. at 25° C. 1.4959, acid number 0.02; it was heptakis(nonylphenyl)tetrakis(polypropylene glycol 425)pentaphosphite, molecular weight 3380, phosphorus content 4.59%.

It was a mixture of isomeric materials having the formulae

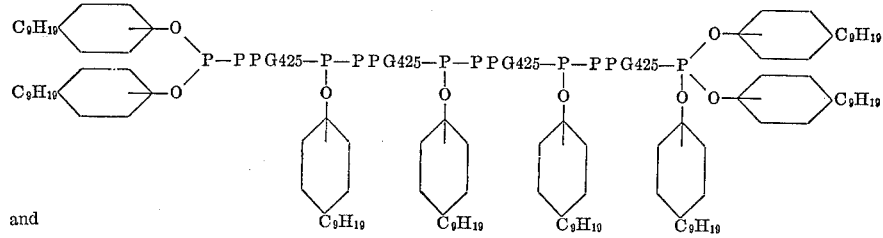

and

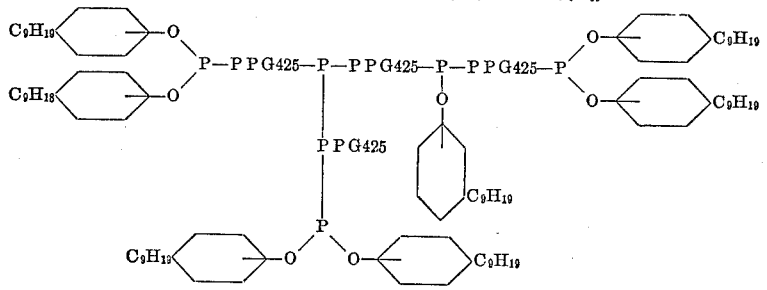

The procedure of Example 3 has been repeated on numerous occasions and the product is now available commercially as Weston 1700 phosphite with the following properties, refractive index $n_D^{25}$ 1.4950–1.4970; specific gravity 25° C./25° C. 1.012–1.022, acid number mg. KOH/gm. Maximum 0.5, phosphorus 4.5–4.6%, insoluble in water but miscible with benzene, toluene and n-hexane.

The product of Example 3 showed remarkable hydrolytic stability for a phosphite. Thus on stirring the heptakis(nonylphenyl)tetrakis(polypropylene glycol 425) pentaphosphite with distilled water at 25° C. The mixture developed a pH of 6. Contact with the water was maintained for 48 hours at 20–25° C. The pH did not undergo change during this period, indicating remarkable hydrolytic stability. At the end of this period, the mixture of water and the polyphosphite still reduced silver nitrate solution rapidly.

EXAMPLE 4

1146 grams (1⅔ moles) of tris(nonylphenyl)phosphite, 1487 grams (3½ moles) of polypropylene glycol 425, 723 grams (2⅓ moles) of triphenyl phosphite and 15 grams of diphenyl phosphite were heated and 660 grams of phenol formed removed by vacuum distillation in the manner described in Example 3. The residue in the flask was treated with sodium carbonate and filtered to recover decakis(nonylphenyl)heptakis(polypropylene glycol 425) octaphosphite, molecular weight 5400, P 4.59%, R.I. 1.4930, acid number 0.50, sp.gr. 1.00 as a light yellow oil of medium viscosity.

In the above series of polyphosphites the viscosity increases very slowly. The viscosity of the polyphosphite member having 8 phosphorus atoms is only 75% greater than that of the monomeric compound having 2 phosphorus atoms.

EXAMPLE 5

There was charged into a 5 liter flask equipped with stirrer, vacuum seal, heater and distillation take off for vacuum operation 802 grams (1⅙ moles) of tris(nonylphenyl)phosphite, 456 grams (2 moles) of bisphenol A, 413 grams (1⅓ moles) of triphenyl phosphite and 10 grams of diphenyl phosphite. There was stripped out 360 grams of phenol under vacuum (theory 376 grams). Terminal conditions were 184° C. and 29.5 inch vacuum. The residue in the flask was stirred with 8 grams of soda ash and 10 grams of Hi-flo filter aid and filtered at 155° C.

The heptakis(nonylphenyl)tetrakis(bisphenol A)pentaphosphite thus produced was a very viscous, light yellow oil, molecular weight 2592, P 5.78%.

EXAMPLE 6

The procedure of Example 3 was repeated replacing the polypropylene glycol 425 by 2 moles of dipropylene glycol to produce heptakis(nonylphenyl)tetrakis(dipropylene glycol)pentaphosphite.

EXAMPLE 7

The procedure of Example 3 was repeated replacing the polypropylene glycol 425 by 2 moles of triethylene glycol and replacing the tris(nonylphenyl)phosphite by 1⅙ moles of tris(octylphenyl)phosphite to produce heptakis(octylphenyl)tetrakis(triethylene glycol)pentaphosphite.

EXAMPLE 8

2 parts of heptakis(nonylphenyl)tetrakis(polypropylene glycol 425)pentaphosphite was mixed with 100 parts of solid polypropylene (melt index 0.8) to give a stabilized product.

EXAMPLE 9

To 100 parts of natural rubber there was added 1.5 grams of heptakis(nonylphenyl)tetrakis(polypropylene glycol)pentaphosphite. The phosphite was thoroughly mixed with the rubber on a rubber mill and the samples were oven aged at 130° C. The product showed improved stability over the rubber alone. Similar improvements were noted when the natural rubber was replaced by either cis-isoprene polymer or butadiene-styrene copolymer (75:25).

The polyphosphites can also be added to aqueous emulsions of the rubber.

EXAMPLE 10

The procedure of Example 3 was repeated replacing the polypropylene glycol 425 by 2 moles of tetrachloro bisphenol A to produce heptakis(nonylphenyl)tetrakis(tetrachloro bisphenol A)pentaphosphite.

EXAMPLE 11

There was charged into a flask 1,290 grams (3 moles) of tris(dipropylene glycol)phosphite, 517 grams (1⅔ moles) of triphenylphosphite, 2,293 grams (3⅓ moles) of tris(nonylphenyl)phosphite and 20 grams of diphenyl phosphite. The distillate stripped out under vacuum totaled 768 grams and consisted of 275 grams of dipropylene glycol, 485 grams of phenol and 8 grams of nonylphenol, terminal distillation conditions were 192° C. and 6 torr. Theoretical yields of distillate from pure starting materials are 470 grams of phenol (5 moles) and 268 grams of dipropylene glycol (2 moles).

At the end of the distillation period, the residue was allowed to cool to 150° C. and 20 grams of dry sodium carbonate added to neutralize the acid and destroy the catalyst. The color changed rapidly from a medium red to a very light yellow on addition of the carbonate. After about 15 minutes of stirring the mixture was subjected to vacuum filtration at 140–150° C.

The decakis(nonylphenyl)heptakis(dipropylene glycol) octaphosphite product obtained was a clear, light yellow fluid of medium viscosity having an R.I. at 25.0° C. of 1.5130 Acid No. 0.0. Fluid had good resistance to hydrolysis but was hydrolyzed somewhat more rapidly than the analogous compound using polypropylene glycol 425.

EXAMPLE 12

The same product as that obtained in Example 13 was obtained by using 1,003 grams (2⅓ moles) of tris(dipropylene glycol)phosphite, 723 grams (2⅓ moles) of triphenyl phosphite, 2,293 grams (3⅓ moles) of tris (nonylphenyl)phosphite and 20 grams of diphenyl phosphite and stripping out 658 grams (7 moles) of phenol.

I claim:

1. A hydrocarbon polymer selected from the group consisting of monoolefin and diolefin polymers stabilized with a stabilizingly effective amount of a compound having the formula

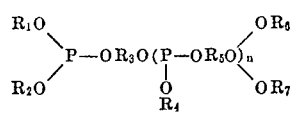

where $R_1$, $R_2$, $R_4$, $R_6$ and $R_7$ are carbocyclic aryl selected from the group consisting of phenyl and alkyl phenyl having 1–18 carbon atoms in the alkyl group and chlorophenyl, $R_3$ and $R_5$ are a member of the group consisting of polyalkylene glycol having ether oxygen separating the alkylene groups and hydrogenated alkylidene bisphenol, and $n$ is an integer of 1 to 18.

2. A composition according to claim 1 wherein said member is a monoolefin polymer.

3. A composition according to claim 1 wherein said member is a diolefin polymer.

4. A composition according to claim 1 wherein said member is stabilized with penta to docosakis(monocarbocyclic aryl)di to nonadeca(poly lower alkylene glycol) tris to eicosakis phosphite, there being 3 less polyalkylene glycol groups and 2 less phosphorus atoms than aryl groups.

5. A composition according to claim 4 wherein said member is a monoolefin polymer.

6. A composition according to claim 4 wherein said member is a diolefin polymer.

7. A composition according to claim 1 wherein said member is stabilized with penta to docosakis(monocarbocyclic aryl)bis to nonadecakis(polypropylene glycol)tris to eicosakis phosphite, there being 3 less polypropylene glycol groups and 2 less phosphorus atoms than aryl groups.

8. A composition according to claim 7 wherein said member is a monoolefin polymer.

9. A composition according to claim 8 wherein the polymer is a polymer of a monoolefin having 2 to 3 carbon atoms and the phosphite is penta to decakis(alkylphenyl)bis to heptakis(polypropylene glycol)tris to octakis phosphite, there being 3 less polypropylene glycol groups and 2 less phosphorus atoms than alkylphenyl groups, said alkyl having 7 to 12 carbon atoms.

10. A composition according to claim 9 wherein the phosphite is heptakis(nonylphenyl)tetrakis(polypropylene glycol 425)pentaphosphite.

11. A composition according to claim 7 wherein said member is a diolefin polymer.

12. A composition according to claim 11 wherein said polymer is natural rubber.

13. A composition according to claim 11 wherein said polymer is butadiene-styrene copolymer.

14. A composition according to claim 11 in which the phosphite is penta to decakis(alkylphenyl)bis to heptakis (polypropylene glycol)tris to octakis phosphite, there being 3 less polypropylene glycol groups and 2 less phosphorus atoms than alkylphenyl groups, said alkyl having 7 to 12 carbon atoms.

15. A composition according to claim 7 wherein the monocarbocyclic aryl is unsubstituted phenyl.

16. A composition according to claim 1 wherein the stabilizing compound is present in an amount of 0.01 to 20% of the hydrocarbon polymer and the hydrocarbon polymer is selected from the group consisting of alpha monoolefin and diolefin polymers.

17. A composition according to claim 1 wherein the hydrocarbon polymer is polystyrene.

18. A composition according to claim 1 wherein $R_3$ and $R_5$ are hydrogenated alkylidene bisphenol.

19. A composition according to claim 18 wherein the hydrogenated alkylidene bisphenol is hydrogenated iso propylidene bisphenol.

References Cited

UNITED STATES PATENTS

| 3,014,951 | 12/1961 | Birum | 260—461 |
| 3,082,189 | 3/1963 | Mack et al. | 260—45.96 |
| 3,305,608 | 2/1967 | Baranauckas et al. | 260—45.7 |

DONALD E. CZAJA, *Primary Examiner.*

H. E. TAYLOR, JR., *Assistant Examiner.*

U.S. Cl. X.R.

260—45.7, 611, 810, 887, 896, 897, 929